(12) United States Patent
Himeno

(10) Patent No.: US 11,960,824 B2
(45) Date of Patent: Apr. 16, 2024

(54) DOCUMENT CREATION SYSTEM

(71) Applicant: IRYOU JYOUHOU GIJYUTU KENKYUSHO CORPORATION, Fukuoka (JP)

(72) Inventor: Shinkichi Himeno, Fukuoka (JP)

(73) Assignee: IRYOU JYOUHOU GIJYUTU KENKYUSHO CORPORATION, Fukuoka (JP)

( * ) Notice: Subject to any disclaimer, the term of this patent is extended or adjusted under 35 U.S.C. 154(b) by 0 days.

(21) Appl. No.: 18/065,737

(22) Filed: Dec. 14, 2022

(65) Prior Publication Data

US 2023/0112419 A1 Apr. 13, 2023

Related U.S. Application Data

(63) Continuation-in-part of application No. PCT/JP2021/031751, filed on Aug. 30, 2021.

(30) Foreign Application Priority Data

Sep. 3, 2020 (JP) ................. 2020-148404

(51) Int. Cl.
*G06F 40/166* (2020.01)
*G06F 3/048* (2013.01)
(Continued)

(52) U.S. Cl.
CPC .......... *G06F 40/166* (2020.01); *G06F 3/0486* (2013.01); *G06F 16/334* (2019.01); *G06F 40/279* (2020.01)

(58) Field of Classification Search
CPC .... G06F 16/334; G06F 3/0486; G06F 40/151; G06F 40/166; G06F 40/186; G06F 40/279
See application file for complete search history.

(56) References Cited

U.S. PATENT DOCUMENTS 9,336,200 B2 * 5/2016 Kadowaki ............ G06F 40/268
10,740,349 B2 * 8/2020 Kohlmeier .......... G06F 16/9024
(Continued)

FOREIGN PATENT DOCUMENTS

| JP | 2148250 A | 6/1990 |
|---|---|---|
| JP | 9146935 A | 6/1997 |

(Continued)

OTHER PUBLICATIONS

International Search Report dated Oct. 5, 2021, in corresponding International Application No. PCT/JP2021/031751, 5 pages.

(Continued)

*Primary Examiner* — Scott T Baderman
*Assistant Examiner* — Mario M Velez-Lopez
(74) *Attorney, Agent, or Firm* — Maier & Maier, PLLC

(57) ABSTRACT

A document creation system includes keyword object management configured to create keyword objects by merging the expression labels and attributes of keywords and to manage the keyword objects, keyword object placement configured to place, in any position of text, a keyword object managed by the keyword object management, keyword object attribute value input configured to input attribute values to the keyword objects, and keyword object-placed document recording/reading configured to record and read the created keyword object-placed document.

6 Claims, 4 Drawing Sheets

(51) Int. Cl.
    *G06F 3/0486*     (2013.01)
    *G06F 16/33*     (2019.01)
    *G06F 40/279*     (2020.01)

(56) References Cited

U.S. PATENT DOCUMENTS

| | | | |
|---|---|---|---|
| 2005/0273705 A1* | 12/2005 | McCain | G06F 40/186 |
| | | | 715/764 |
| 2008/0222516 A1* | 9/2008 | Petri | G06F 40/154 |
| | | | 715/236 |
| 2009/0249180 A1* | 10/2009 | Cheng | G06F 40/103 |
| | | | 715/256 |
| 2010/0251143 A1* | 9/2010 | Thomas | G06F 16/958 |
| | | | 715/769 |
| 2016/0210272 A1* | 7/2016 | Wason | G06F 40/166 |
| 2018/0181556 A1* | 6/2018 | Chang | G06F 40/106 |
| 2020/0327116 A1* | 10/2020 | Perlick | G06F 40/166 |
| 2022/0012290 A1 | 1/2022 | Himeno | |
| 2023/0281230 A1* | 9/2023 | Kukla | G06F 16/334 |
| | | | 707/722 |

FOREIGN PATENT DOCUMENTS

| | | |
|---|---|---|
| JP | 11143876 A | 5/1999 |
| JP | 2001273314 A | 10/2001 |
| JP | 2020177546 A | 10/2020 |

OTHER PUBLICATIONS

Office Action dated Mar. 24, 2021, in corresponding Japanese Application No. 2020-148404, 8 pages.

* cited by examiner

FIG. 1

|  | KEYWORD | SYNONYM | CONTROL ATTRIBUTE | ATTRIBUTE VALUE |
|---|---|---|---|---|
| (EXAMPLE 1) | AGE | YEARS<br>LIFETIME<br>LIFESPAN<br>⋮ | VALUE<br>RANGE 0 ~ 150<br>⋮ | 67 |
| (EXAMPLE 2) | SEX | MALE/FEMALE<br>GENDER<br>SEXUALITY<br>⋮ | OPTIONS<br>MALE<br>FEMALE<br>OTHERS | MALE |
| (EXAMPLE 3) | NAME | FULL NAME<br>FIRST AND LAST NAME<br>GIVEN AND FAMILY NAME<br>⋮ | FREE DESCRIPTION<br>⋮ | Taro YAMADA |

(SYNONYM, CONTROL ATTRIBUTE, and ATTRIBUTE VALUE together form ATTRIBUTE)

DOCUMENT CREATION SYSTEM

TECHNICAL FIELD

The present invention relates to a document creation system that uses keyword objects for efficiently creating a document using keywords.

BACKGROUND

Creating a document requires combining character strings or text forming the basis of the document and diagrams or the like for explaining or illustrating the contents. With respect to diagrams or the like, their form or the format of their input/output or the like with respect to a file needs to be previously determined, unlike text, which is simply inputted.

Also, unlike when inputting text, software for creating, aligning, and/or displaying diagrams is required.

To handle diagrams for general purposes, it is useful to merge data, format, display method, and the like related to the diagrams into objects.

Background art literature relating to the present application includes the following.

CITATION LIST

Patent Literature 1: Japanese Unexamined Patent Application Publication No. 2001-273314
Patent Literature 2: Japanese Unexamined Patent Application Publication No. Hei 02-148250

SUMMARY

With increases in the recording or processing capacity on the Web, movements to use so-called big data in AI and the like have been actively made.

Attempts to collect a great number of documents or the like, such as blogs or patients' charts and explore trends or find hidden correlations to improve diagnosis or treatment in medicine or sales techniques have been made.

However, when actually attempting to analyze collected documents or the like, ambiguous expressions that are not clearly defined, such as "greatly," "considerably," "slightly," and "and the like," or fluctuations in expression are found. Also, depending on the document, keywords required for analysis are not described, which often constitutes an obstacle to analysis.

In such documents called "unstructured documents," it is less effective to simply convert diagrams or the like into objects, and it is necessary to convert them into objects having a little bit smaller granularity.

A method of listing keywords such that any keyword can be checked is also being attempted.

Although this method drastically reduces keyword omission for sure, a document including only check lists is known to be extremely difficult to read. When seeing the document later, the meaning of each sentence is difficult to grasp at a glance. The meaning of each sentence can be understood only when the check lists placed from its beginning to end are reviewed elaborately.

That is, while the document including only the check lists is friendly to a machine that processes it, it is not friendly to a person who works using it.

The present invention has been made to solve the above problems with the background art, and an object thereof is to provide a document creation system that creates a document having no fluctuations in expression or keyword omission and easy to read for persons by previously creating keyword objects in which the expressions and attributes of keywords used to create the document are merged and embedding the keyword objects in text, which is easy to read for persons.

As means for accomplishing the above object, a document creation system includes keyword object management means configured to, when creating a document, create keyword objects by merging expression labels and attributes of keywords forming meaning of the document and to manage the keyword objects, text input means configured to input text to the document, keyword object placement means configured to place, in any position of the text, a keyword object managed by the keyword object management means, keyword object attribute value input means configured to input attribute values to the keyword objects, and keyword object-placed document recording/reading means configured to record and read the created keyword object-placed document. The keyword object-placed document reading means includes conversion-to-plain-text means and plain text re-objectization means.

According to a document creation system, the keyword object attribute value input means uses a method that is one of unlimited, free input of text, input of a value within a limited range, and selection from limited options.

According to a document creation system, the keyword object placement means uses a method that is one of dragging and dropping a keyword object managed by the keyword object management means to any position of the text, selecting a keyword object to be inserted into a position in the text specified by a cursor from a list in the keyword object management means, searching the keyword object management means for a keyword in the inputted text and inserting a corresponding keyword object, and reading a fixed form sentence including a keyword object and inserting the keyword object into a specified position.

According to a document creation system, in case documents including the multiple keyword object-placed documents, the keyword object management means includes keyword object attribute value recording means configured to record attribute values inputted using the keyword object attribute value input means.

According to a document creation system, the keyword object attribute value input means includes keyword object attribute value reference means configured to reference a keyword object attribute value in an identical document or different document recorded in the keyword object attribute value recording means.

According to a document creation system, the keyword object attribute value reference means includes keyword object referenced attribute value calculation means configured to perform calculation using the referenced attribute value.

Advantageous Effects of Invention

The document creation system includes the keyword object management means and thus creates keyword objects by merging expression labels and attributes of keywords and manages the keyword objects.

The document creation system of includes the keyword object placement means and thus places, in any position of the text, a keyword object managed by the keyword object management means.

The document creation system of includes the keyword object attribute value input means and thus inputs attribute values to the keyword objects.

The document creation system of includes the keyword object-placed document recording/reading means and thus records and reads the created keyword object-placed document.

The keyword object-placed document reading means includes the conversion-to-plain-text means and plain text re-objectization means.

In the document creation system, the keyword object attribute value input means uses a method that is one of unlimited, free input of text, input of a value within a limited range, and selection from limited options.

In the document creation system, the keyword object placement means uses a method that is one of dragging and dropping a keyword object managed by the keyword object management means to any position of the text, selecting a keyword object to be inserted into a position in the text specified by a cursor from a list in the keyword object management means, searching the keyword object management means for a keyword in the inputted text and inserting a corresponding keyword object, and reading a fixed form sentence including a keyword object and inserting the keyword object into a specified position.

In the document creation system, the keyword object management means includes the keyword object attribute value recording means configured to record attribute values inputted using the keyword object attribute value input means.

In the document creation system, the keyword object attribute value input means uses a method that is one of unlimited, free input of text, input of a value within a limited range, and selection from limited options and includes the keyword object attribute value reference means configured to reference a keyword object attribute value in an identical document or different document recorded in the keyword object attribute value recording means.

In the document creation system of claim 6, the keyword object attribute value reference means includes the keyword object referenced attribute value calculation means configured to perform calculation using the referenced attribute value.

BRIEF DESCRIPTION OF DRAWINGS

FIG. 1 shows various types of keyword objects.

DETAILED DESCRIPTION

Figure 2:
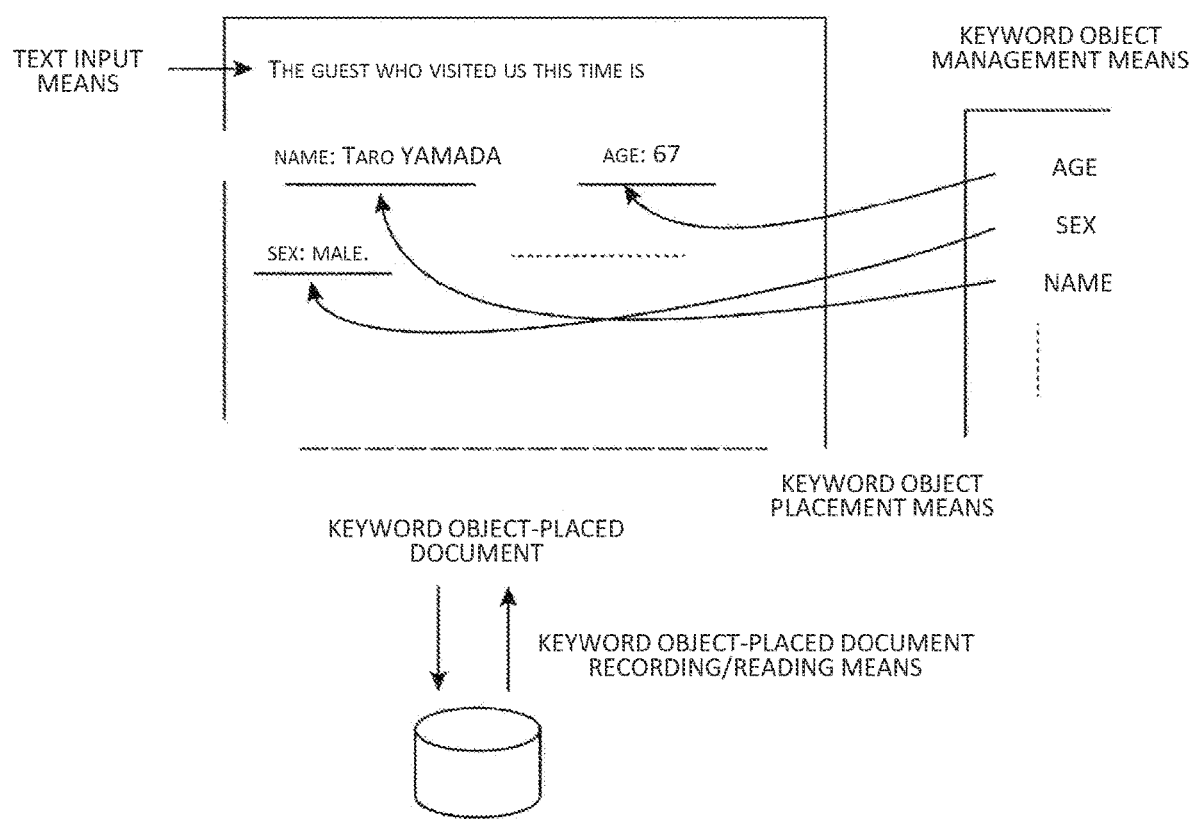
FIG. 2 is a drawing showing the overall configuration of the present invention.

The present application is a system that is run using a computer.

This computer includes an input device (mouse, keyboard, etc.), an output device (monitor, printer, etc.), a storage device (memory, hard disk), an arithmetic unit (CPU), a control unit (CPU), and the like, as well as includes a program for performing the means (functions) of the present application.

The document creation system includes the server apparatus, the database and the terminal. The server apparatus, the database and the terminal connected through network. The server apparatus is a prior computer. The server apparatus includes: an arithmetic apparatus including the processor, a main storage apparatus, an auxiliary storage apparatus, input apparatus, output apparatus, and communication apparatus. The arithmetic apparatus, the main storage apparatus, the auxiliary storage apparatus, input apparatus, output apparatus, the communication apparatus connected through a bus interface. The arithmetic apparatus includes the processor that can execute an instruction set. The main storage apparatus includes a volatile memory such as a random access memory (RAM). The auxiliary storage apparatus includes a recording medium such as a nonvolatile memory, and a recording method thereof is not limited. The recording medium indicates a hard disk drive (HDD) or a solid state drive (SSD), for example. The input apparatus is, for example, a keyboard device. The output apparatus includes, for example, display as a liquid crystal panel. The communication apparatus is a network interface that can connect to network. The processor of the server apparatus executes the function of the units of the document creation system including: a keyword object management means, a text input means, a keyword object placement means, a keyword object attribute value input means, a keyword object-placed document recording/reading means, a conversion-to-plain-text means, a plain text re-objectization means, a keyword object attribute value recording means, a keyword object attribute value reference means, a keyword object referenced attribute value calculation means or the like. The database is composed of the auxiliary storage apparatus of the server apparatus or the auxiliary storage apparatus independent from the server apparatus. The database stores information managed by the document creation system. The terminal is a prior computer including a processor.

FIG. 1 shows various types of keyword objects according to the present invention.

A keyword "age" of Example 1 is an example of input of a value in a limited range.

"Years," "lifetime," "lifespan," and the like are described as synonyms.

Since the synonyms are unified into "age," which is a standard expression, fluctuations in expression in documents are eliminated.

The control attribute shows that the attribute value is a value within a range of 0 to 150. In this document, the attribute value is a value "67" inputted using keyword object attribute value input means.

Example 2 is an example of selection from limited options. The keyword is "sex", and the synonyms are "gender," "sexuality," and the like. The options are "male," "female," and "others" representing LGBT. The attribute value inputted in this example is "male."

Example 3 is an example of unlimited, free input of text. The keyword is "name," and the synonyms are "full name,"

"first and last name," and the like. There is no particular limit to the length of a character string. While, in this example, the attribute value is "Taro YAMADA," "Jugemu, Jugemu, . . . " is also allowed.

FIG. 2 is a drawing showing the overall configuration of the present invention.

Sentences other than keywords are inputted using text input means. When keywords are required, appropriate keyword objects managed by keyword object management means are selected and placed in a sentence using keyword object placement means.

The attribute values are inputted using keyword object attribute value input means on the basis of control attributes defined in the respective keyword objects.

The created keyword object-placed document is recorded in a file or the like using keyword object-placed document recording/management means and is read when necessary.

While "keyword: attribute value" is underlined in FIG. 2 for explanation, the "keyword:" portion or the underline may be hidden depending on the situation.

Figure 3A:
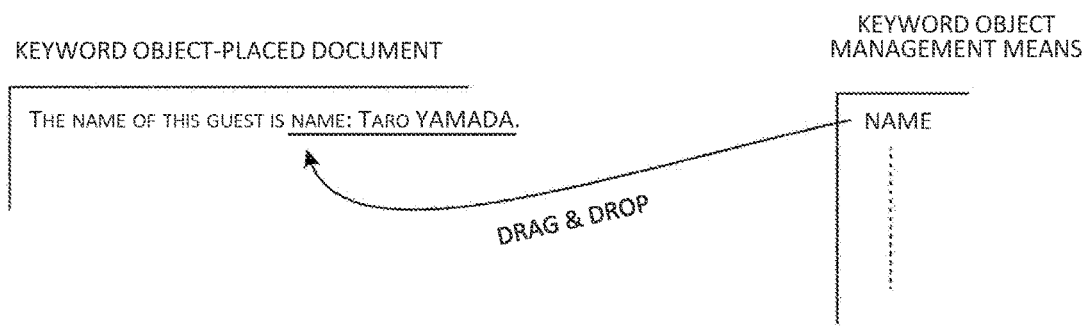
FIG. 3A shows an example of keyword object placement means.
Figure 3B:
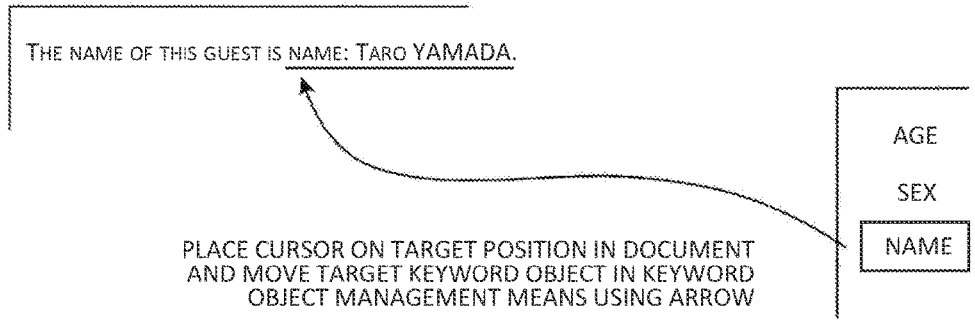
FIG. 3B shows another example of keyword object placement means.
Figure 3C:
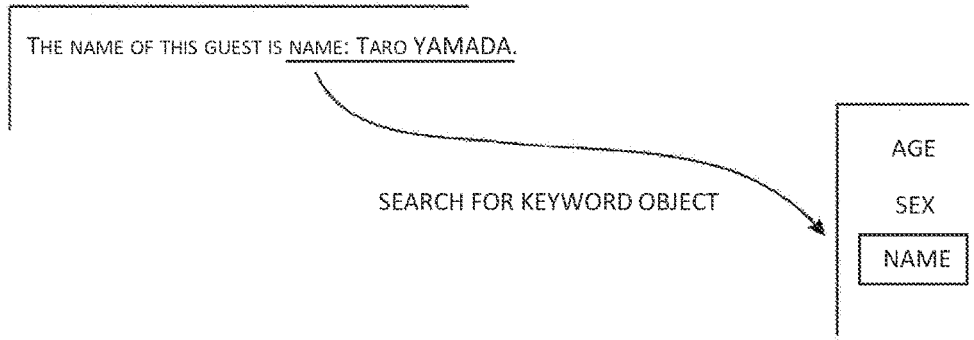
FIG. 3C shows another example of keyword object placement means.

FIGS. 3A to 3C show examples of the keyword object placement means.

FIG. 3A shows a method including highlighting the target keyword object in the keyword object management means using a mouse or the like and dragging and dropping it to the keyword object-placed document. This method is easy to understand intuitively.

FIG. 3B is a method of placing the target keyword object by placing the cursor on the target position in the keyword object-placed document and then selecting the target keyword object in the keyword object management means using an arrow key or the like. Since this method does not use the mouse, the user can place the keyword object in a shorter time if they becomes accustomed to it.

FIG. 3C shows a method in which the user inputs text equivalent to a keyword such as "name" using text input means so that the text is searched for in the keyword object management means; candidate keyword objects are listed; and then the user selects the target keyword among the candidates so that the target keyword object is placed.

The search may be performed in accordance with an instruction serving as a trigger made by the user, or may be performed automatically. While the example keyword object placement methods are shown in FIGS. 3A to 3C, these examples are not limiting. Any method may be used as long as it allows the user to specify the target keyword object in the keyword object management means and to place it in an appropriate position in the keyword object-placed document.

In some cases, it is also useful to previously register fixed form sentences including a keyword object in the keyword object management means, to read one when necessary, and to insert it into a specified position using one of the methods of FIGS. 3A to 3C.

Figure 4:
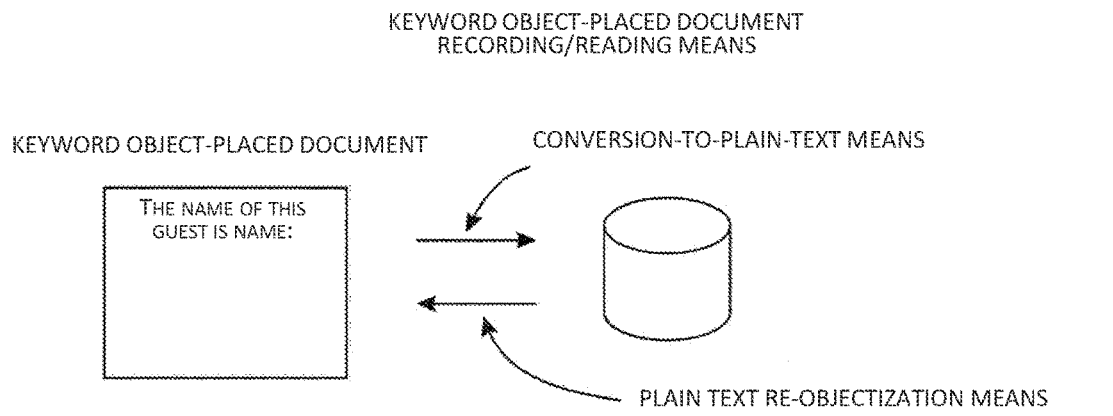
FIG. 4 is a drawing showing keyword object-placed document recording/reading means.

FIG. 4 is a drawing showing the keyword object-placed document recording/reading means.

The keyword object-placed document can be easily edited by recording or reading keyword objects while holding the keyword objects in the document.

However, the keyword objects themselves include a great amount of auxiliary data for input, such as synonyms, control attributes, and the like, as shown in FIG. 1. and thus increase the data capacity for recording the document.

For this reason, with respect to documents that have been confirmed and need not be edited in the future, the keyword objects are deleted therefrom, and the documents including only the attribute values are recorded (conversion-to-plain-text means). Thus, the recording capacity can be significantly reduced.

It is also useful to have a function of, when the plain text needs to be re-edited, re-objectizing the keywords in the plain text so that the keyword object-placed document is restored (plain text re-objectization means).

Figure 5:
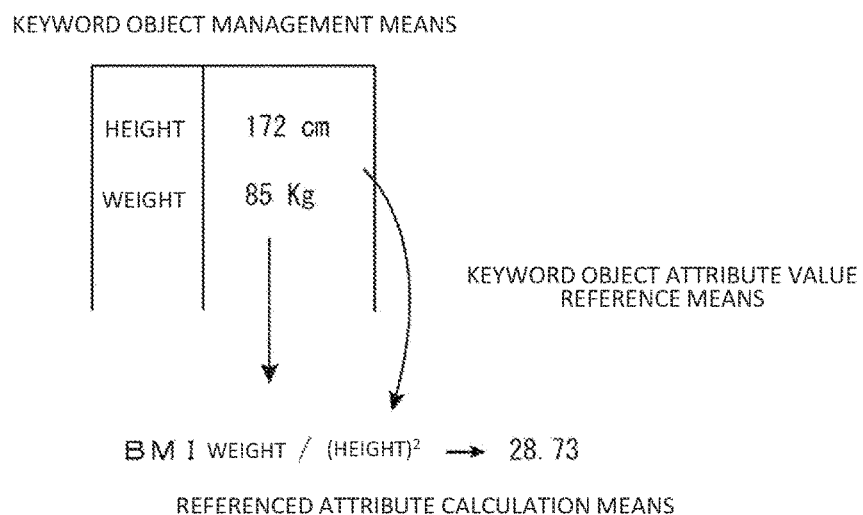
FIG. 5 is a drawing showing keyword object attribute value reference means and referenced attribute calculation means that use keyword object attribute value recording means.

FIG. 5 is a drawing showing keyword object attribute value reference means and referenced attribute calculation means that use keyword object attribute value recording means.

Attribute values are inputted to the keyword objects in the keyword object-placed document using the keyword object attribute value input means.

The inputted attribute values are sufficiently useful even if they are only locally recorded in the keyword objects. On the other hand, by recording the inputted attribute values also in the corresponding keyword objects in the keyword object management means (keyword object attribute value recording means), the inputted attribute values can be referenced not only in the keyword object-placed document but also from case documents including multiple keyword object-placed documents.

In FIG. 5, the attribute values of the keyword objects of height and weight are recorded in the corresponding keyword objects in the keyword object management means.

Thus, the recorded attribute values of the keyword objects can be referenced not only in the keyword object-placed document but also from different documents.

For example, height, weight, and the like need to be inputted to various documents such as electronic health records. If attribute values inputted to a document are recorded in the keyword object attribute value recording means, the attribute values can be referenced from other keyword object-placed documents using the keyword object attribute value reference means when necessary. This eliminates the need to repeatedly input the attribute values a number of times, as well as prevents input errors. If necessary, it is also useful to provide keyword object attribute value recording means across multiple cases, to collectively record keyword object attribute values in the cases, and to create statistical data on the attributes.

In an example of BMI shown in FIG. 5, the BMI is automatically calculated, displayed, and recorded by referencing the attribute values of height and weight and performing calculation defined in the control attribute of the keyword object of BMI (keyword object referenced attribute value calculation means).

While an embodiment has been described above, the specific configuration of the present invention is not limited to the embodiment. Design changes and the like are also included in the present invention without departing from the spirit and scope of the present invention.

The invention claimed is:

1. A document creation system comprising:
    a processor configured to, when creating a document, create keyword objects by merging expression labels and attributes of keywords forming meaning of the document and to manage the keyword objects; wherein
    the processor is configured to input text to the document, keyword object placement means configured to place, in any position of the text, a keyword object managed by the processor,
    the processor is configured to input attribute values to the keyword objects,
    the processor is configured to record and read the created keyword object-placed document, the processor is configured to delete a keyword object and record a document including only attribute values as a plain text, the processor is configured to re-objectize a keyword in the plain text so that the keyword object-placed document is restored, and the processor is configured to search a keyword object corresponding to a keyword input during text input from the keyword objects managed by the processor, and to insert a searched keyword object.

2. The document creation system of claim 1, wherein the processor is configured to use a method that is one of unlimited, free input of text, input of a value within a limited range, and selection from limited options.

3. The document creation system of claim 1, wherein the processor is configured to use a method that is one of:

dragging and dropping a keyword object managed by the processor to any position of the text;

selecting a keyword object to be inserted into a position in the text specified by a cursor from a list; and reading a fixed form sentence including a keyword object and inserting the keyword object into a specified position.

4. The document creation system of claim 1, wherein in case documents including the plurality of keyword object-placed documents, the processor is configured to record attribute values inputted.

5. The document creation system of claim 4, wherein the processor is configured to reference a keyword object attribute value in an identical document or different document recorded.

6. The document creation system of claim 5, wherein the processor is configured to perform calculation using the referenced attribute value.

* * * * *